Dec. 27, 1932.  W. F. HACKETT  1,891,925
KITCHEN APPLIANCE
Filed April 9, 1932  2 Sheets-Sheet 1
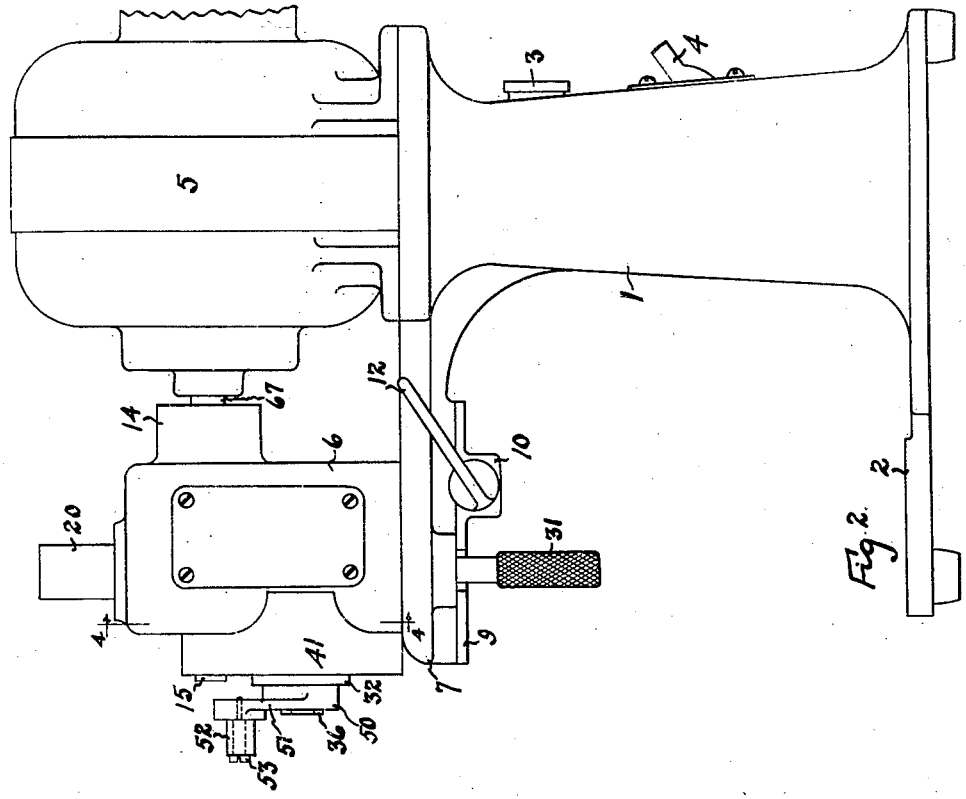
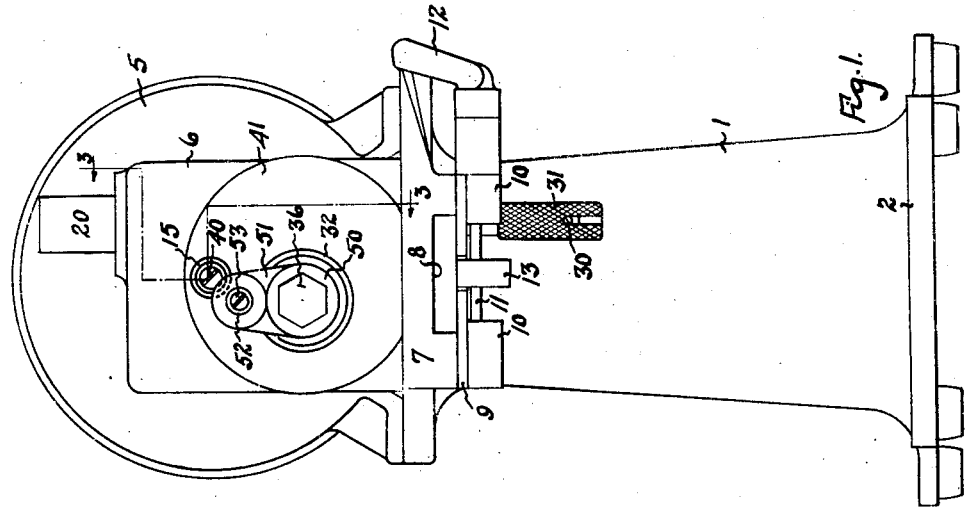
INVENTOR-
William F. Hackett.
BY Darby + Darby
ATTORNEYS.

Dec. 27, 1932.  W. F. HACKETT  1,891,925
KITCHEN APPLIANCE
Filed April 9, 1932   2 Sheets-Sheet 2

INVENTOR-
William F. Hackett
BY Darby & Darby
ATTORNEY-S.

Patented Dec. 27, 1932

1,891,925

UNITED STATES PATENT OFFICE

WILLIAM F. HACKETT, OF NEW YORK, N. Y.

KITCHEN APPLIANCE

Application filed April 9, 1932. Serial No. 604,182.

This invention relates to improvements in power driven kitchen appliances such as those devices now used for fruit juice extractors, mixers, vegetable mashers and the like.

The general object of this invention is to provide an improved form of device of this nature.

One of the prime objects of the invention is to provide a power operated kitchen appliance having a plurality of power outlets operating at different speeds for driving various forms of extractors, mixers, mashers and other similar devices.

An important object of the invention is to provide an exceedingly simple and efficient mechanism for providing a plurality of power outlets from a single power source.

A still further object of this invention is to provide an operating mechanism which is silent in operation, requires a minimum amount of power, and which is so constructed as not to require oil for lubrication.

A still further object of the invention is to provide power outlet attachments of simple construction so that appliances may be easily attached thereto.

These and many other objects as will appear from the following disclosure are secured by means of this invention.

This invention resides substantially in the combination, construction, arrangement and relative location of parts as will appear from the following detailed description.

Referring to the drawings—

Figure 1 is a front elevational view of the device of this invention;

Fig. 2 is a side elevational view of the device with a portion of the driving motor broken away;

Figure 4:
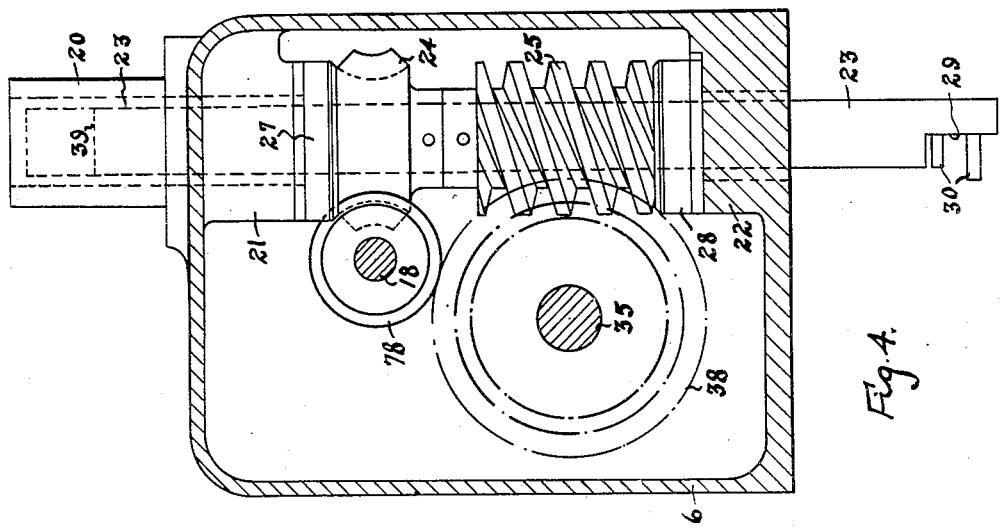
Fig. 4 is a cross-sectional view taken on the line 4—4 of Fig. 2 of the gear box.
Figure 3:
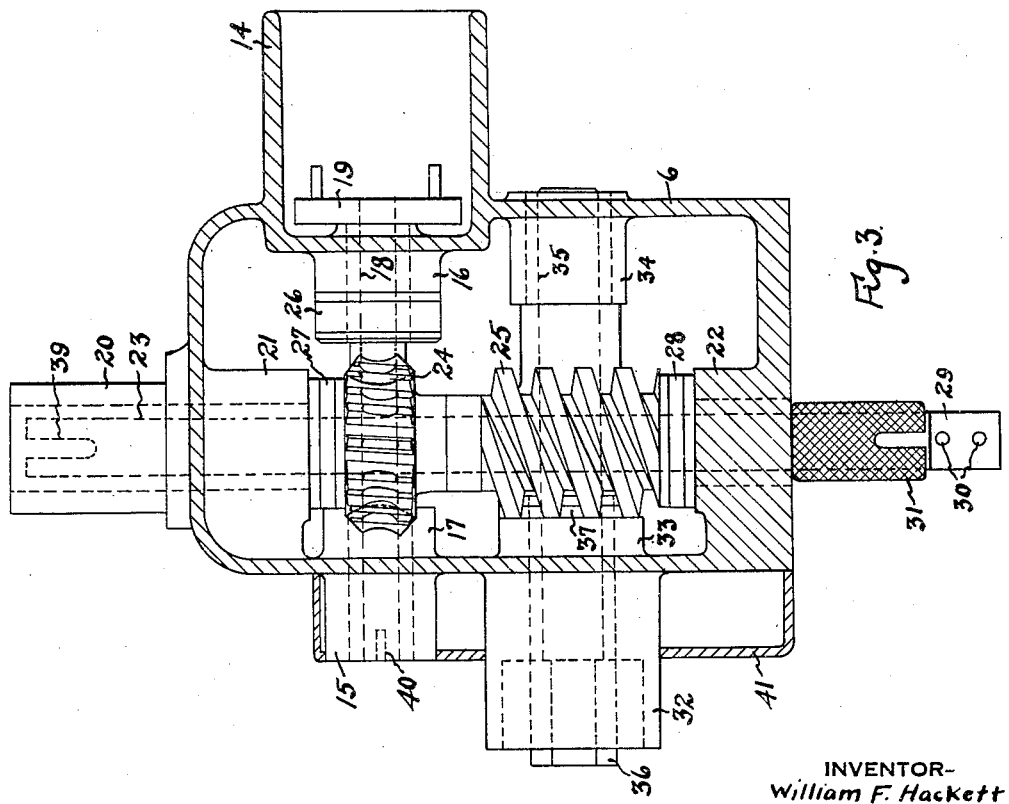
Fig. 3 is a cross-sectional view taken on the line 3—3 of Fig. 1 of the gear box.

Power driven juice extractors, mixers, vegetable mashers and the like, are now known in a number of forms but the most common known devices are provided with only one power outlet which limits the utility of the device considerably. It is often desirable to operate at the same time more than one appliance and it is for this reason that the device of this invention has been developed. In developing the device it has been one of the objects of the invention to provide as simple a structure as possible with as many power outlets to which a number of appliances may be easily coupled for simultaneous operation. In attaining simplicity of structure an operating mechanism has been produced which requires minimum lubrication. Oil lubrication of such devices is undesirable because the lubricating medium has a tendency to work down and get into the materials operated upon.

In the prior art devices of this nature have developed along the line of employing a rotating shaft carrying the beating or mixing implement having a planetary movement. In other devices a fixed axis of rotation for the shaft has been employed but only one power outlet has been provided. One of the important features of the present invention is the provision of a plurailty of power outlets with a shaft rotating on a fixed axis and adapted to carry beating or mixing implements. Such a structure is exceedingly simple in construction, relatively cheap to manufacture and adapted to mass production.

The nature of the invention will be best understood by detailed reference to the drawings. The device comprises a suitable spaced pedestal 1 having a supporting base with an extension 2 to receive kitchen utensils and support them in the proper position. At 3 is shown a connecting plug by means of which the device may be connected through a flexible cord to the house lighting circuit. 4 illustrates a suitable switch for turning the current on or off. At 5 is a small electric motor supported at the upper end of the pedestal for operating the device. The upper end of the pedestal is provided with a forwardly extending platform 7 which is longitudinally recessed as indicated at 8 which recess is closed by means of a cover plate 9 which is provided with a rearwardly extending slot for a distance as is clear in Fig. 1. Journaled on the plate 9 in the bearings 10 is a shaft 11 which may be operated by means of a small lever or handle 12. The shaft 11 is provided with an eccentric cam 13 which moves upwardly through the slot in plate 9 into the recess 8 when the shaft is operated by the handle.

Secured to the top of the extension 7 is a gear box 6 containing the necessary operating mechanism to be driven by the motor 5. The gear box 6 is provided with a cylindrical hollow extension 14 in longitudinal alignment with a similar extension 15 on the front of the casing. Journaled in the bearings 16 and 17 forming part of the casing, is a shaft 18 to which is secured a driving worm 78. The end of shaft 18 projecting into the extension 15 is slotted as indicated at 40 to provide a clutch arrangement for attachment to any device to be operated. The other end of the shaft is provided with a suitable clutch device 19 by means of which the shaft 18 is attached to the shaft 67 of the driving motor. As will be apparent shaft 18 is directly connected to the shaft 67 of the motor and operates at the same speed. Hence shaft 18 is the high speed shaft of the device and suitable high speed appliances may be operated thereby, such as a cleaning and buffing wheel. At 26 is diagrammatically illustrated a thrust bearing for the shaft 18.

The top of the casing is provided with a cylindrical hollow extension 20 in which the upper end of shaft 23 projects. The shaft 23 is journaled in the bearings 21 and 22 formed on the casing. Secured to the shaft 23 is a worm wheel 24 which meshes with the worm 78 on shaft 18. Shaft 23 has also mounted on it a worm 25. As before thrust bearings 27 and 28 are provided. The upper end of shaft 23 is longitudinally notched as indicated at 39 to permit ready attachment of any desired appliance such as a fruit juice extractor. Shaft 23 extends through the bottom of the casing and is notched as indicated at 29 and provided with two pins 30, the lower pin being the longer. Slidably mounted on the shaft is a knurled collar 31 longitudinally notched as shown, so as to slide down over the end of the shaft as indicated in Fig. 1. Suitable appliances may be attached thereto, such as a mixing paddle. Such a paddle would be provided with a shaft like the shaft 23 and similarly notched and provided with holes so as to slip over the pins 30. The collar 31 is then slid down into the position shown in Fig. 1 locking the paddle securely in place. The casing is also provided with another hollow extension 32 through which the hexagonal shaped end 36 of the shaft 35 projects. This shaft is journaled in the bearings 33 and 34 and is provided with a worm wheel 38 which meshes with the worm 25. A thrust bearing 37 as before is provided. As indicated in Fig. 1 a suitable crank arm operating mechanism may be attached to the hexagonal end 36 of the shaft 35. This crank consists of a collar 50 having extending arm 51 and provided at its outer end with a roller 52 mounted on the machine screw 53.

From the above construction it will be seen that the gear box has three shafts, two of which operate on axes at right angle to the axis of the third shaft. One of these transverse shafts operates at the same speed as the motor and drives the other two shafts. The vertical shaft and the other transverse shaft are, in turn, operated from the first transverse shaft and at different speeds. Such an arrangement provides four power outlets, three of which operate at different speeds so that as many as four appliances may be simultaneously operated. The appliances operated from the lower end of shaft 23 project into a bowl or pan which rests on the extension 2. Appliances to be operated by the crank project into a suitable utensil which can be provided with an extension to fit in the groove 8 and be secured therein by means of the cam locking device as will be apparent.

From the above description those skilled in the art will readily appreciate that the principles of this invention may be embodied in other physical forms without departure therefrom and I do not desire, therefore, to be strictly limited to the disclosure as given for purposes of illustration but rather to the scope of the appended claims.

What I seek to secure by United States Letters Patent is:

1. In a device as described the combination comprising a support, a driving motor mounted on said support, a housing mounted on said support, a vertical shaft journaled on a fixed axis in said housing, at least two horizontal transverse shafts journaled in said housing and operatively connected to said vertical shaft, a connection between one of the horizontal shafts and the motor and means forming part of each of said shafts including both ends of the vertical shaft for attaching implements to be operated.

2. In a device as described the combination comprising a support, a driving motor mounted on said support, a casing mounted on said support, a vertical shaft journaled on a fixed axis in said casing, at least two horizontal transverse shafts journaled in said casing and operatively connected to said vertical shaft, the vertical shaft projecting above and below the casing and the horizontal shafts projecting beyond the casing, a connection between one of the horizontal shafts and the motor and means forming part of the projecting ends of the vertical shaft and a projecting end of each horizontal shaft for attaching implements to be operated thereto.

3. A device as described, comprising a support, a motor mounted on said support, a housing on said support, a horizontal shaft journaled in said housing, means for directly coupling the motor to one end of said shaft for operating it at motor speed, means on the other end of the shaft for attaching an implement thereto, a vertical shaft journaled in said housing and projecting therebeyond at both ends, means on each end of said vertical shaft for attaching implements thereto, means for driving the vertical shaft from the horizontal shaft, a second horizontal shaft journaled in said housing, means on one end of the second horizontal shaft for attaching an implement thereto, and means for driving the second horizontal shaft from the vertical shaft.

4. A food-working device, comprising a support, a motor mounted on said support, a housing on said support, a horizontal shaft journaled in said housing, means for directly coupling the motor to one end of said shaft for operating it at motor speed, a vertical shaft journaled in said housing, means on each end of said vertical shaft for attaching implements thereto, means for driving the vertical shaft from the horizontal shaft, a second horizontal shaft, means on one end of the second horizontal shaft for attaching an implement thereto, and means for driving the second horizontal shaft from the vertical shaft.

5. A food-working device, comprising a support, a motor mounted on said support, a housing on said support, a horizontal shaft journaled in said housing, means for directly coupling the motor to one end of said shaft for operating it at motor speed, means for attaching implements to one end of said shaft, a vertical shaft journaled in said housing, means on each end of said vertical shaft for attaching implements thereto, means for driving the vertical shaft from the horizontal shaft, a second horizontal shaft, means on one end of the second horizontal shaft for attaching an implement thereto, and means for driving the second horizontal shaft from the vertical shaft.

6. A food-working device, comprising a support, a motor mounted on said support, a housing on said support, a horizontal shaft journaled in said housing, means for directly coupling the motor to one end of said shaft for operating it at motor speed, a vertical shaft journaled in said housing, means on one end of said vertical shaft for attaching implements thereto, means for driving the vertical shaft from the horizontal shaft, a second horizontal shaft, means on one end of the second horizontal shaft for attaching implements thereto, and means for driving the second horizontal shaft from the vertical shaft.

7. A food-working device, comprising a support, a motor mounted on said support, a housing on said support, a horizontal shaft journaled in said housing, means for directly coupling the motor to one end of said shaft for operating it at motor speed, means for attaching implements to one end of said shaft, a vertical shaft journaled in said housing, means on one end of said vertical shaft for attaching implements thereto, means for driving the vertical shaft from the horizontal shaft, a second horizontal shaft, means on one end of the second horizontal shaft for attaching implements thereto, and means for driving the second horizontal shaft from the vertical shaft.

In testimony whereof I have hereunto set my hand on this 7th day of April A. D., 1932.

WILLIAM F. HACKETT.